(12) United States Patent
Lu et al.

(10) Patent No.: US 10,566,714 B2
(45) Date of Patent: Feb. 18, 2020

(54) HIGH-DENSITY SMALL FORM-FACTOR PLUGGABLE MODULE, HOUSING, AND SYSTEM

(71) Applicant: Alibaba Group Holding Limited, George Town, Grand Cayman (KY)

(72) Inventors: Rui Lu, Hangzhou (CN); Chongjin Xie, Morganville, NJ (US); Jie Cao, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 15/926,850

(22) Filed: Mar. 20, 2018

(65) Prior Publication Data
US 2018/0277971 A1 Sep. 27, 2018

(30) Foreign Application Priority Data
Mar. 24, 2017 (CN) .......................... 2017 1 0187124

(51) Int. Cl.
*H04J 14/02* (2006.01)
*H01R 12/70* (2011.01)
*H04L 29/06* (2006.01)
*H04B 10/25* (2013.01)
*H01R 13/04* (2006.01)
*H01R 12/00* (2006.01)
*H04B 10/50* (2013.01)

(52) U.S. Cl.
CPC ......... *H01R 12/7005* (2013.01); *H01R 12/00* (2013.01); *H01R 13/04* (2013.01); *H04B 10/25* (2013.01); *H04B 10/506* (2013.01); *H04J 14/0227* (2013.01); *H04L 29/06088* (2013.01); *H04L 69/14* (2013.01)

(58) Field of Classification Search
CPC .... H01R 12/7005; H01R 9/091; H01R 13/04; H01R 12/00; H04B 10/25; H04B 10/506; H04J 14/0227; H04L 29/06088; H04L 69/14
USPC .......................................................... 398/79
See application file for complete search history.

(56) References Cited

U.S. PATENT DOCUMENTS

| | | |
|---|---|---|
| 5,305,412 A | 4/1994 | Paoli |
| 6,016,219 A | 1/2000 | Fatehi |
| 6,175,560 B1 | 1/2001 | Bhagalia et al. |
| 6,266,168 B1 | 7/2001 | Denkin |
| 6,341,032 B1 | 1/2002 | Fukashiro |
| 6,433,922 B1 | 8/2002 | Ghera |
| 6,650,468 B1 | 11/2003 | Bryant |

(Continued)

*Primary Examiner* — Mohammad R Sedighian
(74) *Attorney, Agent, or Firm* — Shun Yao; Park, Vaughan, Fleming & Dowler LLP

(57) ABSTRACT

Embodiments described herein provide an apparatus for facilitating a double-density small form-factor pluggable (SFP-DD) module. The apparatus includes a set of control connector pins for exchanging control signals. The apparatus also includes a first set of communication connector pins for establishing a first communication channel and a second set of communication connector pins for establishing a second communication channel. The set of control connector pins and the first set of communication connector pins correspond to connector pins of an SFP module, and the second set of communication connector pins extends the SFP module. The size of the SFP-DD module corresponds to the size of the SFP module.

20 Claims, 13 Drawing Sheets

(56) References Cited

U.S. PATENT DOCUMENTS

| | | | |
|---|---|---|---|
| 6,754,420 B2 | 6/2004 | Tsuritani | |
| 6,952,395 B1 | 10/2005 | Manoharan | |
| 7,024,110 B2 | 4/2006 | Jasti | |
| 7,123,404 B1 | 10/2006 | Mori | |
| 7,136,583 B2 | 11/2006 | Oberg | |
| 7,231,146 B2 | 6/2007 | Arecco | |
| 7,400,829 B2 | 7/2008 | Watanabe | |
| 7,756,422 B2 | 7/2010 | Sakamoto | |
| 8,822,895 B2 | 9/2014 | Abedin | |
| 9,712,239 B2 | 7/2017 | Murshid | |
| 9,787,418 B2 * | 10/2017 | Earl | H04J 3/0697 |
| 9,917,672 B2 | 3/2018 | Jensen | |
| 2001/0021045 A1 | 9/2001 | Tervonen | |
| 2002/0154353 A1 | 10/2002 | Heath | |
| 2004/0037555 A1 | 2/2004 | Evangelides | |
| 2004/0090662 A1 | 5/2004 | Bang | |
| 2004/0114925 A1 | 6/2004 | Berthold | |
| 2004/0146305 A1 | 7/2004 | Neubelt | |
| 2004/0175187 A1 | 9/2004 | Eiselt | |
| 2004/0208506 A1 | 10/2004 | Kinoshita | |
| 2004/0213577 A1 | 10/2004 | Sugahara | |
| 2005/0025486 A1 | 2/2005 | Zhong | |
| 2005/0047781 A1 | 3/2005 | El-Reedy | |
| 2005/0074236 A1 | 4/2005 | Urimindi | |
| 2005/0110980 A1 | 5/2005 | Maehara | |
| 2006/0087975 A1 | 4/2006 | Zheng | |
| 2006/0115266 A1 | 6/2006 | Levi | |
| 2006/0176545 A1 | 8/2006 | Nakamura | |
| 2009/0028562 A1 | 1/2009 | Gianordoli | |
| 2009/0103915 A1 | 4/2009 | Aprile | |
| 2009/0226174 A1 | 9/2009 | Csupor | |
| 2009/0245786 A1 | 10/2009 | Sakamoto | |
| 2009/0262790 A1 | 10/2009 | Molotchko | |
| 2010/0091355 A1 | 4/2010 | Ota | |
| 2010/0284687 A1 | 11/2010 | Tanzi | |
| 2010/0290780 A1 | 11/2010 | Teipen | |
| 2010/0296808 A1 | 11/2010 | Hinderthuer | |
| 2011/0116786 A1 | 5/2011 | Wellbrock | |
| 2011/0126005 A1 * | 5/2011 | Carpenter | G06F 13/385 713/158 |
| 2011/0274435 A1 | 11/2011 | Fini | |
| 2012/0020672 A1 | 1/2012 | Aguren | |
| 2012/0033966 A1 | 2/2012 | Rosenbluth | |
| 2012/0106971 A1 | 5/2012 | Sugaya | |
| 2012/0294604 A1 | 11/2012 | Roberts | |
| 2013/0189856 A1 | 7/2013 | Ko | |
| 2013/0223484 A1 * | 8/2013 | Tang | H04B 10/40 375/219 |
| 2013/0236175 A1 | 9/2013 | Sethumadhavan | |
| 2013/0243438 A1 * | 9/2013 | Tang | H04B 10/40 398/135 |
| 2013/0272694 A1 | 10/2013 | Sandstrom | |
| 2013/0343757 A1 | 12/2013 | Wigley | |
| 2014/0013402 A1 | 1/2014 | Bugenhagen | |
| 2014/0029941 A1 | 1/2014 | Bratkovski | |
| 2014/0105592 A1 | 4/2014 | Kataria | |
| 2014/0153922 A1 | 6/2014 | Ryf | |
| 2014/0186021 A1 | 7/2014 | Striegler | |
| 2014/0248059 A1 * | 9/2014 | Tang | H04B 10/40 398/136 |
| 2014/0258772 A1 | 9/2014 | Kataria | |
| 2014/0286648 A1 | 9/2014 | Buelow | |
| 2014/0363171 A1 * | 12/2014 | Tang | H04B 10/40 398/135 |
| 2015/0249501 A1 | 9/2015 | Nagarajan | |
| 2015/0296279 A1 | 10/2015 | Bouda | |
| 2015/0341123 A1 | 11/2015 | Nagarajan | |
| 2016/0056889 A1 | 2/2016 | Le Taillandier De Gabory | |
| 2016/0233959 A1 | 8/2016 | Murshid | |
| 2016/0277101 A1 | 9/2016 | Jiang | |
| 2017/0155466 A1 | 6/2017 | Zhou | |
| 2017/0214463 A1 | 7/2017 | Milione | |
| 2017/0299900 A1 | 10/2017 | Montoya | |
| 2017/0353242 A1 | 12/2017 | Mansouri Rad | |
| 2017/0353265 A1 | 12/2017 | Mansouri Rad | |

* cited by examiner

US 10,566,714 B2

HIGH-DENSITY SMALL FORM-FACTOR PLUGGABLE MODULE, HOUSING, AND SYSTEM

RELATED APPLICATION

Under 35 U.S.C. § 119, this application claims the benefit and right of priority of Chinese Patent Application No. 201710187124.9, filed 24 Mar. 2017.

BACKGROUND

Field

This disclosure is generally related to the field of data communication. More specifically, this disclosure is related to a high-density small form-factor pluggable (SFP) module, housing, and system for facilitating increased bandwidth density of an SFP package.

Related Art

In today's networks, high-speed connections are typically implemented using SFP modules (e.g., a communication module in a small form-factor pluggable package). For example, 40 or 100 gigabytes per second (40 G or 100 G) connections, which are heavily used in datacenters, can be implemented using quad SFP (QSFP) modules. The data rate of a QSFP module is generally four times the rate of an SFP module. Therefore, in a network, 10 G and 25 G SFP modules are often used for coupling servers and edge switches, 40 G and 100 G QSFP modules are used for coupling edge and aggregate switches, and the rate of QSFP package modules is generally quadruple the rate of SFP package modules. FIG. 1A illustrates an exemplary SFP module, in accordance with a prior art.

With increasing bandwidth demand in datacenter networks, 40 G and 100 G network connections may be unable to meet the demand. The bandwidth requirement of the next generation datacenter networks is expected to reach 400 G. To accommodate such high bandwidth, multiple ports of a switch are typically configured to operate as a port channel, supporting a higher bandwidth link than an individual port can. However, this approach requires multiple ports of a switch dedicated for a single connection, thereby reducing the port density of the switch.

To facilitate a switch with a high port density, each port supporting a high bandwidth connection, a 100 G SFP module has emerged. With current technologies, 100 G signals may not be modulated on a single photoelectric signal channel in a short time due to the limitations of high-speed signals and high-speed photoelectric components. However, single-channel 50 G signals can be implemented using a 4-level pulse-amplitude modulation (PAM4) technique.

While a high-bandwidth connection brings many desirable features to a datacenter, some issues remain unsolved in facilitating a switch with high port density.

SUMMARY

Embodiments described herein provide an apparatus for facilitating a double-density small form-factor pluggable (SFP-DD) module. The apparatus includes a set of control connector pins for exchanging control signals. The apparatus also includes a first set of communication connector pins for establishing a first communication channel and a second set of communication connector pins for establishing a second communication channel. The set of control connector pins and the first set of communication connector pins correspond to connector pins of an SFP module, and the second set of communication connector pins extends the SFP module. The size of the SFP-DD module corresponds to the size of the SFP module.

In a variation on this embodiment, the SFP-DD module is downward-compatible with the SFP module. The apparatus can then include a position restriction that aligns the SFP module with the first set of communication pins.

In a variation on this embodiment, the second set of communication connector pins is on the host side with respect to the first set of communication connector pins in the SFP-DD module.

In a variation on this embodiment, each of the first and second sets of communication connector pins includes a set of transmission pins and a set of reception pins.

In a variation on this embodiment, if the second set of communication connector pins requires additional power, the second set of communication connector pins includes a set of power and ground pins.

In a variation on this embodiment, the apparatus includes clock and data recovery (CDR) circuitry that extracts timing information and recovers transmitted symbols. The transmitted symbols are one or more of: electrical signal and optical signal.

In a further variation, the apparatus further includes wavelength-division multiplexing (WDM) transponder circuitry configured to convert between the electrical signal and the optical signal.

In a variation on this embodiment, the first set of communication connector pins can accommodate (e.g., can couple) a first cable for transmitting a signal associated with the first communication channel and a second cable for receiving a signal associated with the first communication channel. Similarly, the second set of communication connector pins can accommodate a third cable for transmitting a signal associated with the second communication channel and a fourth cable for receiving a signal associated with the second communication channel.

In a further variation, the first, second, third, and fourth cables form one or more of: active optical cable (AOC) and direct attach cable (DAC).

In a variation on this embodiment, the SFP-DD module can reside in a corresponding SFP-DD port in a server, thereby facilitating a communication channel between the server and an access switch.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of increasing the bandwidth of a small form-factor pluggable (SFP) module by incorporating at least two transmission and reception channels within the SFP package. Such an SFP module can be referred to as a double-density SFP (SFP-DD) module. An SFP-DD module can be a copper module, which carries signal via a copper cable, or an optical module, which carries optical signal via an optical cable. The SFP-DD module doubles the signal rate while maintaining the small package size of an SFP. As a result, a device (e.g., a switch or a server) equipped with SFP-DD modules can attain higher bandwidth with a high port density.

With existing photoelectric signal technology, 100 G optical modules may not be implemented using SFP packages. In particular, there may not be an appropriate solution to implement a 100 G connection between a server and a switch in a datacenter. One 100 G connection can be established using two 50 G SFPs at an increased cost. On the other hand, QSFP and micro-QSFP (μQSFP) use four 25 G channels. However, these technologies may not work well with other modules, such as Octal SFP (OSFP) and QSFP-DD modules.

In addition, port density on a switch is limited to the physical dimensions of the switch. For example, a switch with a rack unit of 1U can accommodate 64 SFP ports on its front panel. However, the same switch can only accommodate 36 QSFP28 ports. Furthermore, the conversion between 25 G and 50 G signals may increase the cost and power consumption of a module. Moreover, neither QSFP28 nor μQSFP is downward-compatible (or backward-compatible) with SFP modules, which are heavily used in current datacenters.

To solve these problems, embodiments described herein facilitate an SFP-DD module that provides at least two high-speed signal channels using an SFP package. This allows the SFP-DD module to increase bandwidth while remaining downward-compatible with existing solutions. In addition, similar to an SFP-based front panel, SFP-DD interfaces can provide high port density to a switch. To facilitate a higher signal rate, the SFP-DD module can include an additional row of connector pins on the host side (i.e., the side toward the host with the direction of module insertion).

Figure 1A:
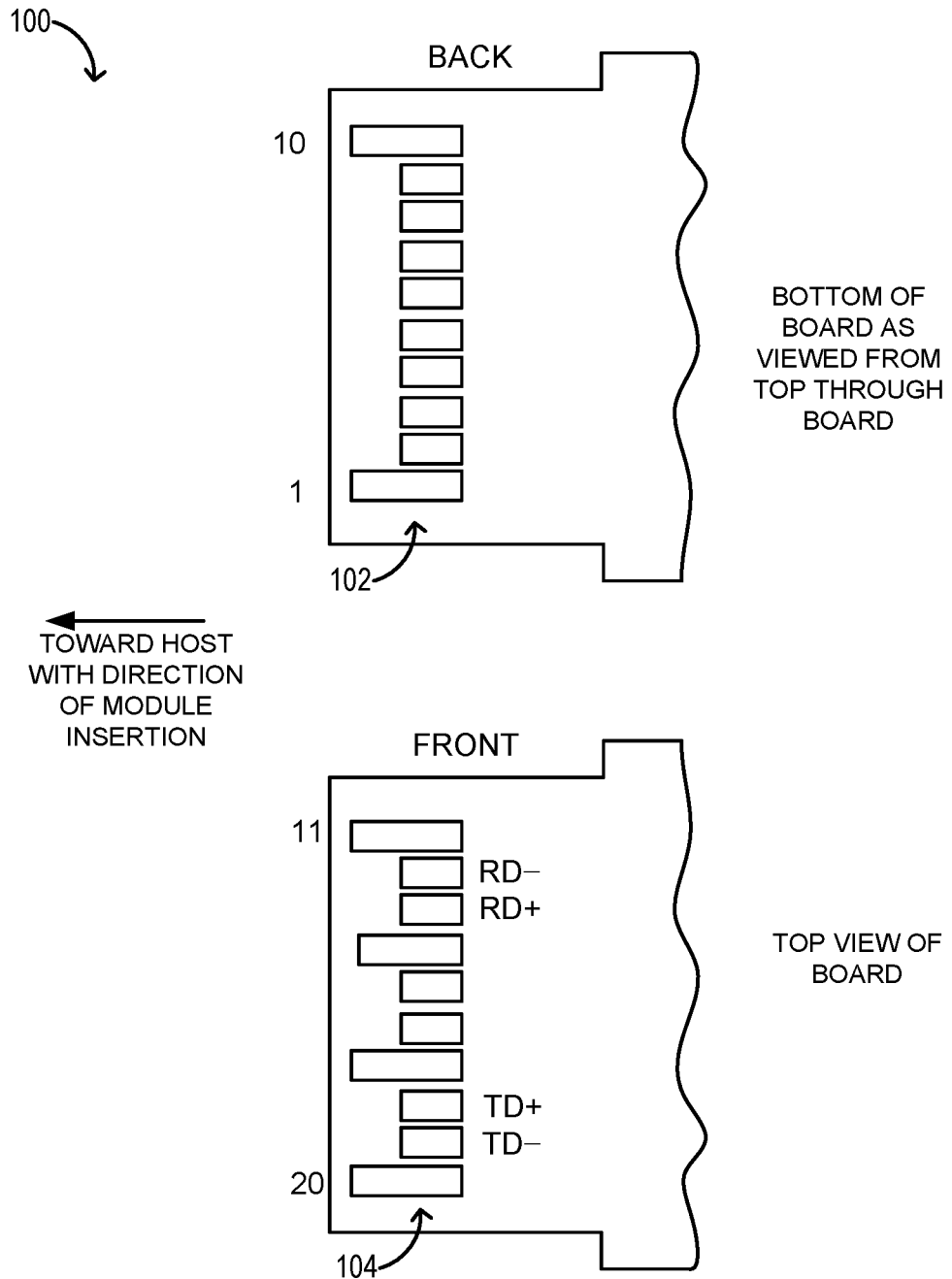
FIG. 1A illustrates an exemplary small form-factor pluggable (SFP) module, in accordance with a prior art.

As shown in FIG. 1A, the board (e.g., the printed circuit board or PCB) of an SFP module 100 includes set of low-speed connector pins 102 that includes control signal and ground pins (e.g., pins 1-10). The control signal pins can be used for receiving low-speed control signals and the ground pins are used for outputting low-speed control signals. SFP module 100 can also include set of communication pins 104 that includes transmission and reception signal pins corresponding to a single communication channel (e.g., pins 11-20). Communication pins 104 can also include connector pins for power and ground.

Including an additional row of connector pins, the SFP-DD module includes at least two rows of connector pins for communication. The additional row of connector pins can include at least one group of high-speed connector pins that provides an additional communication channel in the SFP-DD module. In this way, the SFP-DD module provides two high-speed signal channels. The additional row can include connectors for power and/or ground signals. However, these power/ground connectors may not be added if additional power consumption is not needed. The additional row of connector pins should be coupled to any other modules, such as an optical-to-electrical converter, on the SFP-DD package (e.g., the caging that includes the SFP module) via the connections on the PCB.

This design can ensure downward-compatibility with a single-channel SFP module. It should be noted that, to accommodate the additional row of connector pins, an SFP-DD module can be longer than a single-channel SFP module. In some embodiments, the SFP-DD package can incorporate a position restriction that ensures that a single-channel SFP module is properly aligned with the communication pin (e.g., communication pins 104 in FIG. 1A). The SFP-DD module can be inserted into a corresponding SFP-DD port. Except the above-mentioned elements, other elements may remain identical to those of a single-channel SFP.

Exemplary System

Figure 1B:
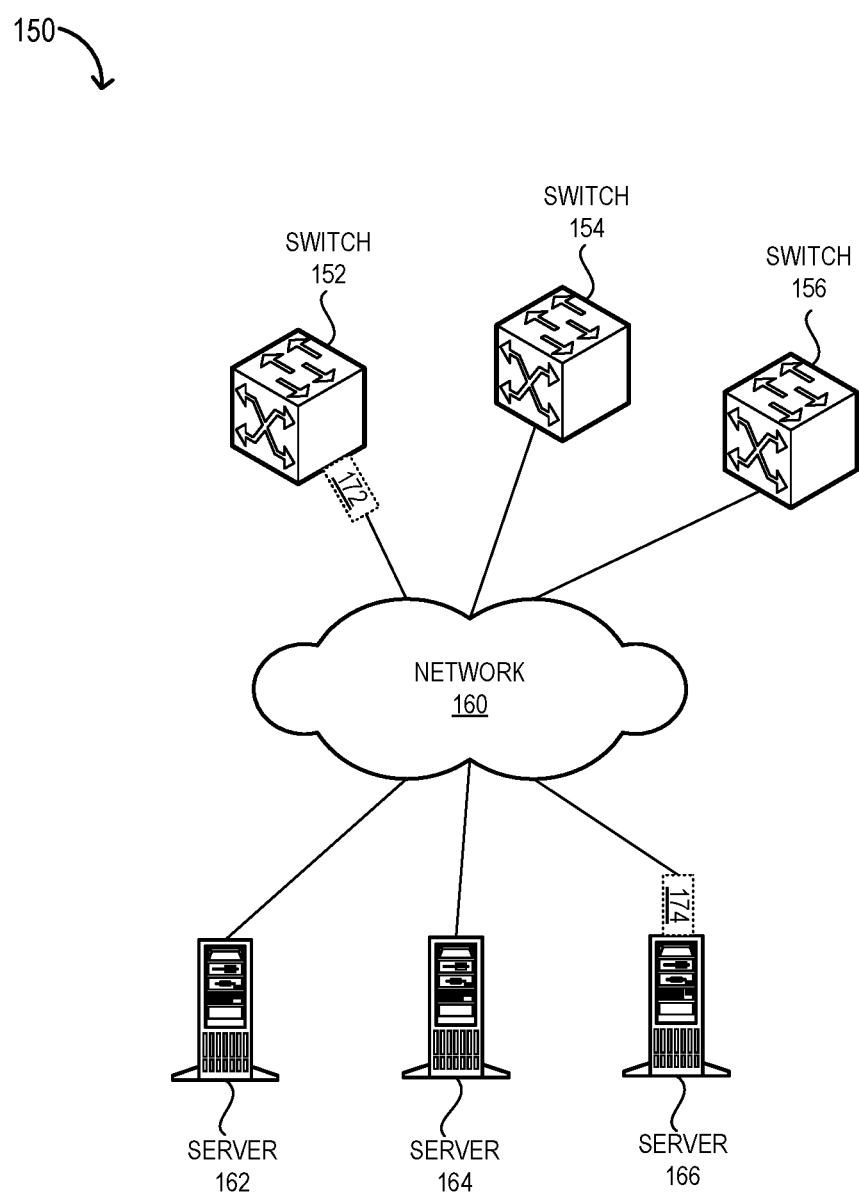
FIG. 1B illustrates an exemplary datacenter network using double-density SFP (SFP-DD) modules, in accordance with an embodiment of the present application.

FIG. 1B illustrates an exemplary datacenter network using SFP-DD modules, in accordance with an embodiment of the present application. In this example, a number of switches 152, 154, and 156 can communicate via a network 160 (e.g., a next generation 400 G network) with servers 162, 164, and 166, which can be part of a datacenter 150. Servers 162, 164, and 166 can be storage servers, each of which can include a CPU, an interface card, and storage devices or modules. For example, server 166 can include a central processing unit (CPU), a memory, a network interface card (NIC), and a number of high-performance storage devices (e.g., solid-state drives or SSDs).

With existing technologies, there may not be an appropriate solution to implement a 100 G connection between a server and a switch in datacenter 150. To establish a 100 G connection between switch 152 and server 166, two 50 G SFPs can be used, which can lead to an increased cost. Moreover, switch 152 may accommodate 64 SFP ports on its front panel. However, switch 152 can only accommodate 36 QSFP28 ports. Furthermore, the conversion between 25 G and 50 G signals may increase the cost and power consumption of switch 152. Moreover, neither QSFP28 nor μQSFP are downward-compatible with SFP modules, which can be heavily used in datacenter 150.

To solve these problems, server 166 can be coupled with an SFP-DD module 174 that provides at least two high-speed signal channels. Similarly, switch 152 can also be coupled with SFP-DD module 172. To support SFP-DD modules 172 and 174, switch 152 and server 166 can be equipped with SFP-DD ports that can accommodate both single-channel SFP modules and SFP-DD modules. Using SFP-DD modules 172 and 174, a 100 G connection can be established via network 160. In this way, SFP-DD modules can facilitate high-bandwidth connection in datacenter 150 while ensuring high port density in switch 152.

SFP-DD Modules

Figure 2A:
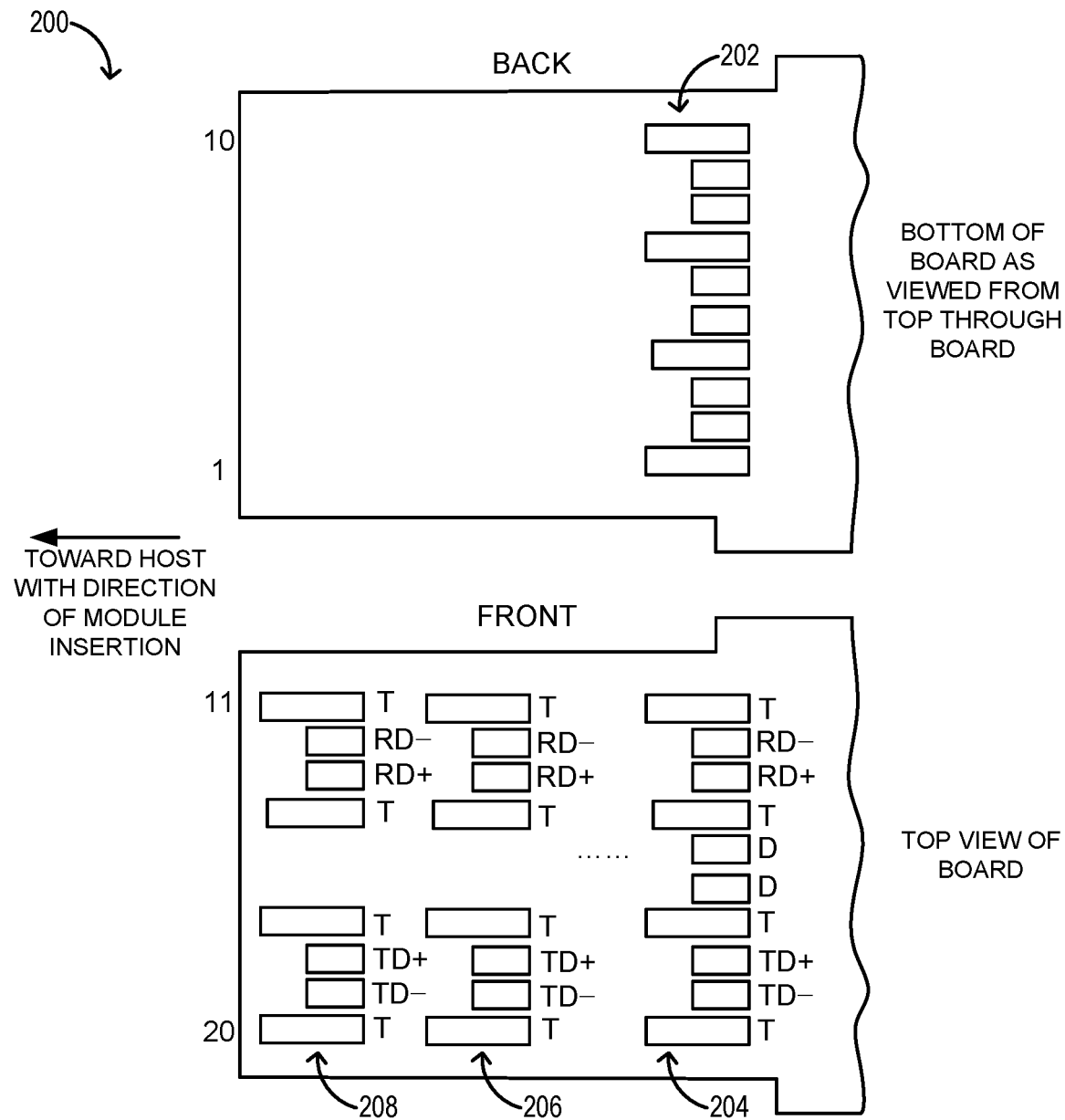
FIG. 2A illustrates an exemplary SFP-DD module with multi-layer high-density signal pin groups, in accordance with an embodiment of the present application.

FIG. 2A illustrates an exemplary SFP-DD module with multi-layer high-density signal pin groups, in accordance with an embodiment of the present application. In this example, an SFP-DD module 200 can include a number of additional rows of connector pins on the host side. This allows SFP-DD module 200 to support a higher number of channels. For example, with two additional rows of connector pins, SFP-DD module 200 can support at least three channels.

As shown in FIG. 2A, SFP-DD module 200 can include a set of low-speed connector pins 202 that includes control signal and ground pins (e.g., pins 1-10). The control signal pins can be used for receiving low-speed control signals and the ground pins are used for outputting low-speed control signals. SFP-DD module 200 can also include set of communication pins 204 that includes transmission and reception signal pins corresponding to a single communication channel. Communication pins 204 can also include connector pins for power and ground. Power and ground pins are used for supplying power.

Suppose that SFP-DD module 200 includes two additional rows of connector pins 206 and 208 (e.g., aligned with pins 11-20). If these connector pins are communication pins, SFP-DD module 200 can include at least three rows of connector pins for communication. Each of the additional rows of connector pins can include at least one group of high-speed connector pins that provides an additional communication channel in SFP-DD module 200. For example, communication pins 206 can include a set of transmission pins (TD+ and TD−), and a set of reception pins (RD+ and RD−). In this way, SFP-DD module 200 provides three high-speed signal channels.

In some embodiments, the number of additional rows of connector pins is programmable. SFP-DD module 200 can include both connector pins 206 and 208. However, only one of them can be programmed to be active at a time. This can allow a simple and generic manufacturing of SFP-DD module 200 with differentiated service. SFP-DD module 200 with both connector pins 206 and 208 active can have a higher price than an SFP-DD module 200 that has only one of connector pins 206 and 208 active.

Figure 2B:
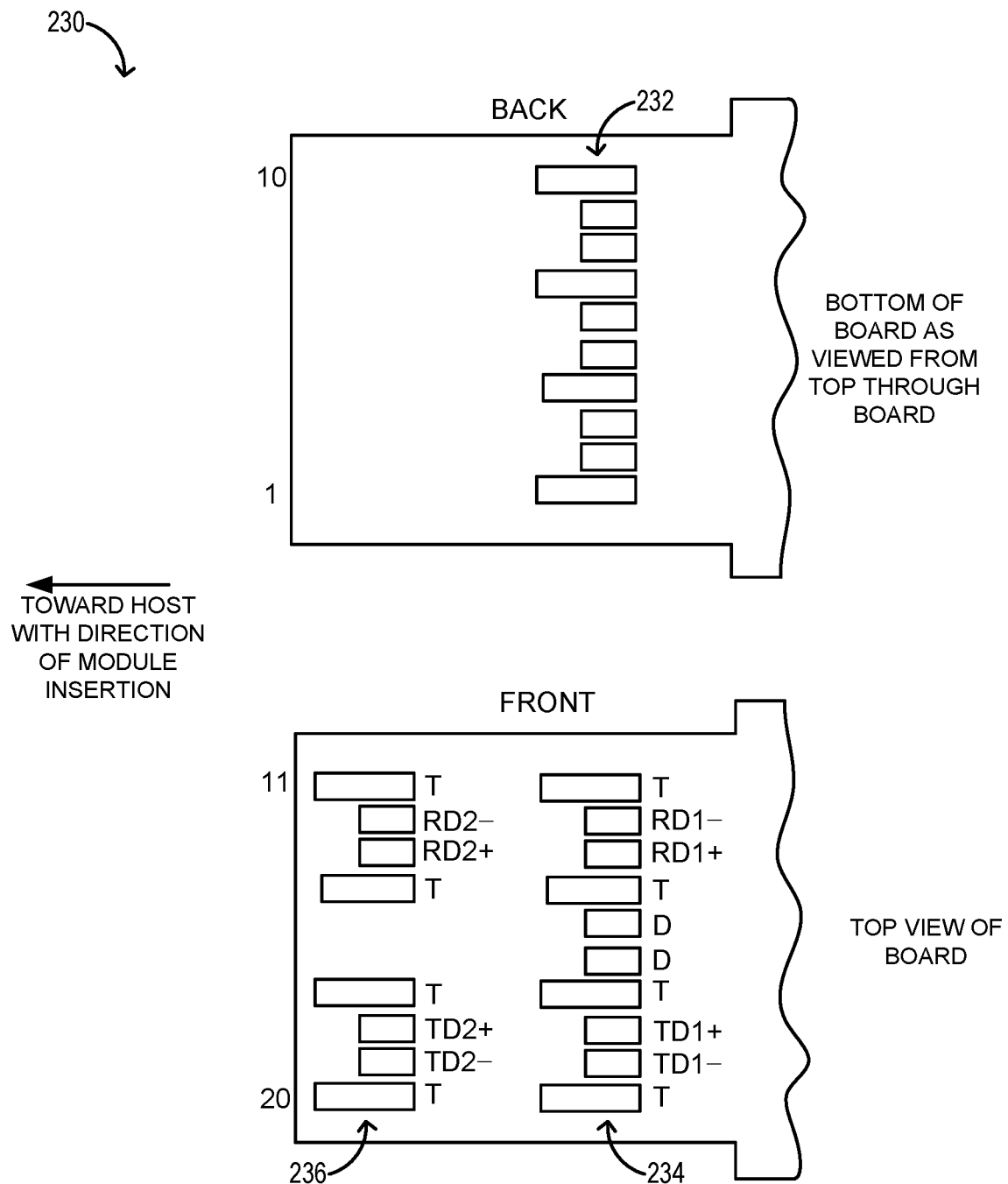
FIG. 2B illustrates an exemplary SFP-DD module with double-density signal pin groups, in accordance with an embodiment of the present application.

FIG. 2B illustrates an exemplary SFP-DD module with double-density signal pin groups, in accordance with an embodiment of the present application. Similar to the example in FIG. 2A, an SFP-DD module 230 can include a set of low-speed connector pins 232 that includes control signal and ground pins (e.g., pins 1-10). The control signal pins can be used for receiving low-speed control signals and the ground pins are used for outputting low-speed control signals. SFP-DD module 230 can also include set of communication pins 234 that includes transmission pins (TD1+ and TD1−) and reception pins (RD1+ and RD1−) corresponding to a single communication channel. Communication pins 234 can also include connector pins for power (D) and ground (T). Power and ground pins are used for supplying power.

To support at least two communication channels, SFP-DD module 230 can include an additional row of connector pins 236 on the host side (e.g., aligned with pins 11-20). In other words, since connector pins 236 are communication pins, SFP-DD module 230 can include at least two rows of connector pins for communication. Communication pins 236 can include at least one group of high-speed connector pins that provides an additional communication channel in SFP-DD module 230. For example, communication pins 236 can include a set of transmission pins (TD2+ and TD2−), and a set of reception pins (RD2+ and RD2−).

Suppose that communication pins 236 do not incur additional power consumption for SFP-DD module 230. Communication pins 236 then may not include connector pins for power (D) and/or ground (T) signals. Communication pins 236 should be coupled to any other modules, such as an optical-to-electrical converter, on the SFP-DD package of SFP-DD module 230 via the connections on the PCB.

The design of SFP-DD module 230 may ensure downward-compatibility with a single-channel SFP module (e.g., SFP module 100 in FIG. 1A). It should be noted that, to accommodate communication pins 236, SFP-DD module 230 can be longer than SFP module 100. In some embodiments, the SFP-DD package of SFP-DD module 230 can incorporate a position restriction that ensures that SFP module 100 is properly aligned with communication pins 234.

Figure 2C:
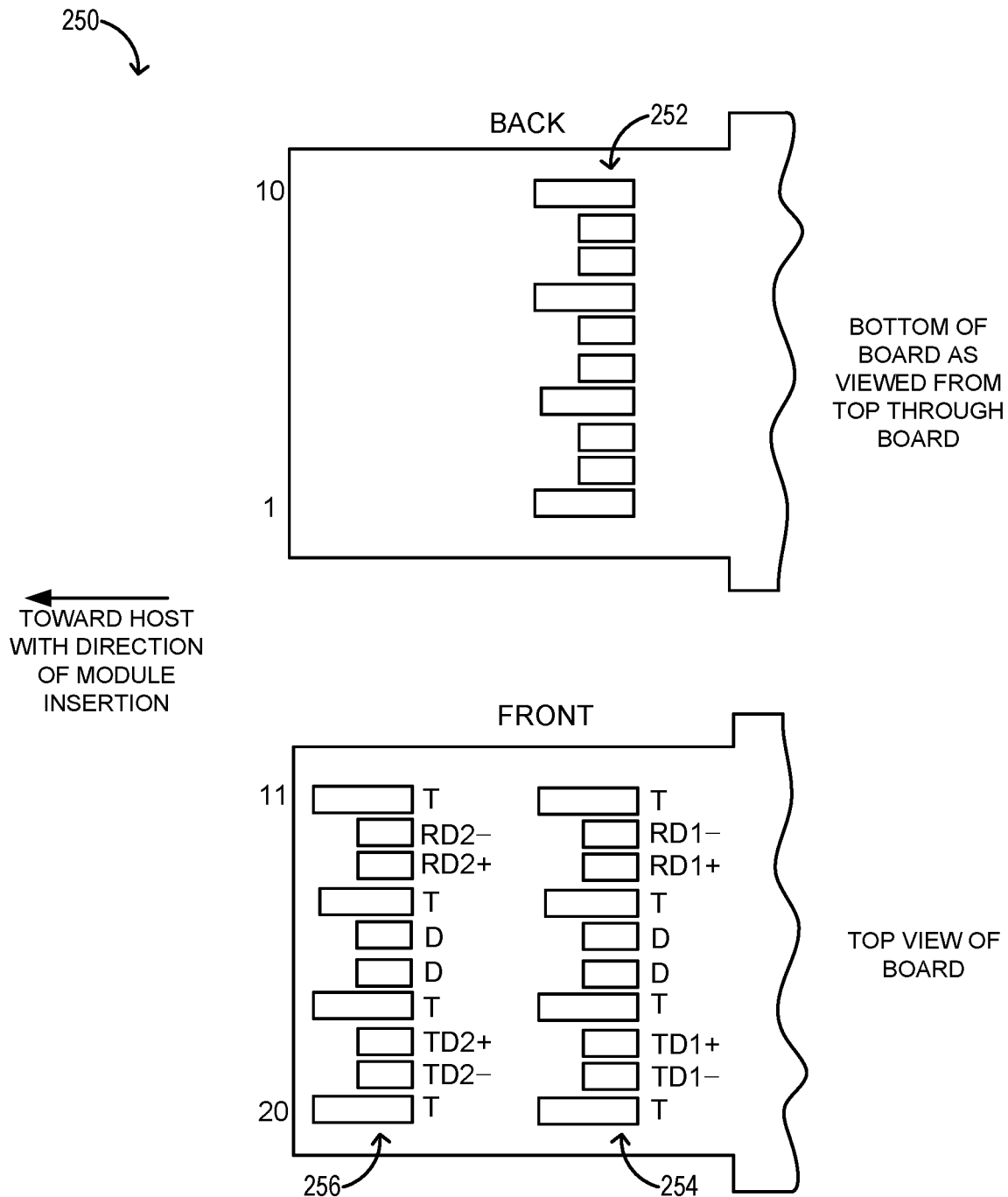
FIG. 2C illustrates an exemplary SFP-DD module with double-density signal pin groups and additional power pins, in accordance with an embodiment of the present application.

FIG. 2C illustrates an exemplary SFP-DD module with double-density signal pin groups and additional power pins, in accordance with an embodiment of the present application. In this example, an SFP-DD module 250 can include a set of low-speed connector pins 252 that includes control signal and ground pins. The control signal pins can be used for receiving low-speed control signals and the ground pins are used for outputting low-speed control signals. SFP-DD module 250 can also include set of communication pins 254 that includes transmission pins (TD1+ and TD1−) and reception pins (RD1+ and RD1−) corresponding to a single communication channel. Communication pins 254 can also include connector pins for power (D) and ground (T). Power and ground pins are used for supplying power.

To support at least two communication channels, SFP-DD module 250 can include an additional row of connector pins 256 on the host side. In other words, since connector pins 256 are communication pins, SFP-DD module 250 can include at least two rows of connector pins for communication. Communication pins 256 can include at least one group of high-speed connector pins that provides an additional communication channel in SFP-DD module 250. For example, communication pins 256 can include a set of transmission pins (TD2+ and TD2−), and a set of reception pins (RD2+ and RD2−).

Suppose that communication pins 256 can incur additional power consumption for SFP-DD module 250. Communication pins 256 can then include connector pins for power (D) and/or ground (T) signals. The power and ground pins can depend on the number of transmission and reception signal pins in communication pins 256. Each power pin can be placed corresponding to positions of the set of transmission signal pins and the set of reception signal pins.

SFP-DD Packaging

Figure 3:
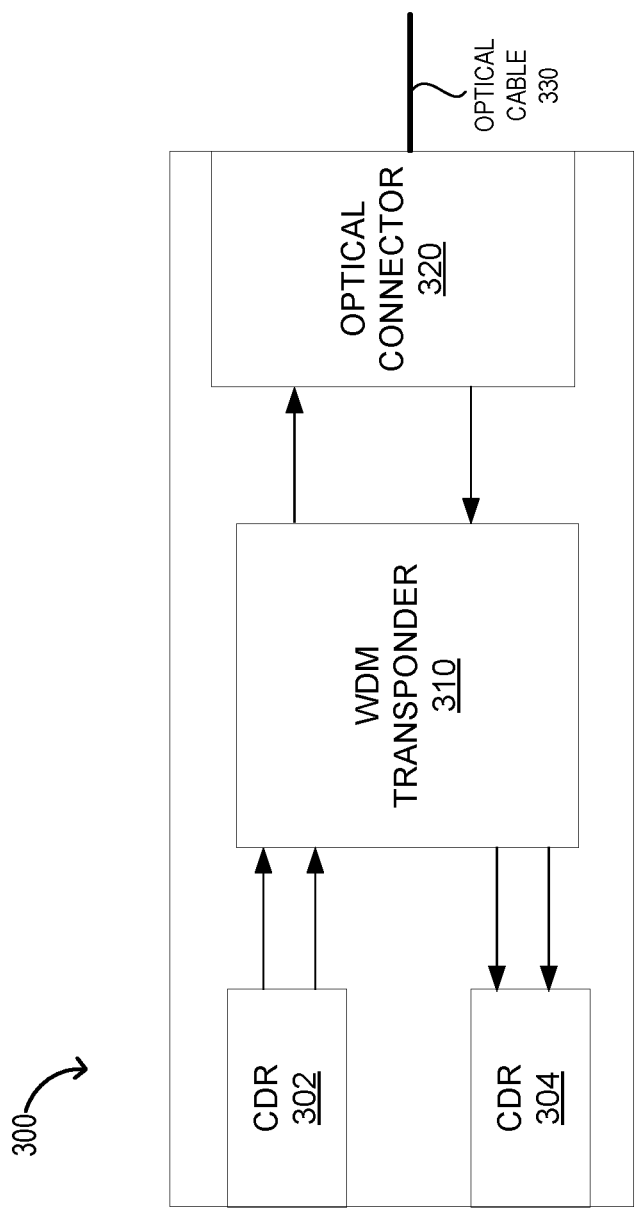
FIG. 3 illustrates an exemplary SFP-DD package supporting signal conversion, in accordance with an embodiment of the present application.

FIG. 3 illustrates an exemplary SFP-DD package supporting signal conversion, in accordance with an embodiment of the present application. An SFP-DD package 300 can include a clock and data recovery (CDR) 302, which can extract timing information and recover transmitted symbols. Since an SFP-DD can receive optical signals, CDR 302 can convert the symbols encoded in an optical signal to a corresponding digital signal (i.e., a corresponding bit stream). Typically, a number of bits are encoded in a transmitted signal based on a corresponding modulation technique. For example, if CDR 302 is based on PAM4, data is encoded in the amplitude of signal pulses with $2^2$ possible discrete pulse amplitudes. SFP-DD package 300 can include multiple CDRs, such as CDRs 302 and 304.

SFP-DD package 300 can also include a wavelength-division multiplexing (WDM) transponder 310, which can convert an electrical signal to an optical signal, thereby allowing SFP-DD package 300 to transfer the optical signal via an optical cable. WDM transponder 310 can be based on, without being limited to, an electrical-to-optical/optical-to-electrical conversion multi-mode shortwave WDM (SWDM) and bidirectional or single-mode coarse WDM (CWDM). Furthermore, WDM transponder 310 can be one or more of: a multi-mode wavelength division multiplexer, a photoelectric multi-mode wavelength division multiplexer, a single-mode wavelength division multiplexer, and a the photoelectric single-mode wavelength division multiplexer.

During operation, if SFP-DD package 300 is used with a computing device (e.g., server 166 in FIG. 1A), the computing device may use CDRs 302 and/or 304 to generate an electrical signal based on PAM4 modulation. WDM transponder 310 can convert the electrical signal to a corresponding optical signal and provide the optical signal to optical connector 320. SFP-DD package 300 then uses optical connector 320 to transmit that signal to an optical cable 330. Optical connector 320 can be an SFP-DD module coupled to optical cable 330. The optical signal then can travel via optical cable 330 at a data rate of 100 Gbps.

In some embodiments, CDR 302 can include two 50 G PAM4 optical-to-electrical conversion modules that convert two 50 G PAM4 electrical signals to two corresponding 50 G PAM4 optical signals in SFP-DD package 300. By using two 50 G PAM4 modules, the bandwidth density is quadrupled. This allows SFP-DD package 300 to facilitate 100 G optical communication while maintaining a size similar to that of a traditional SFP package.

Figure 4:
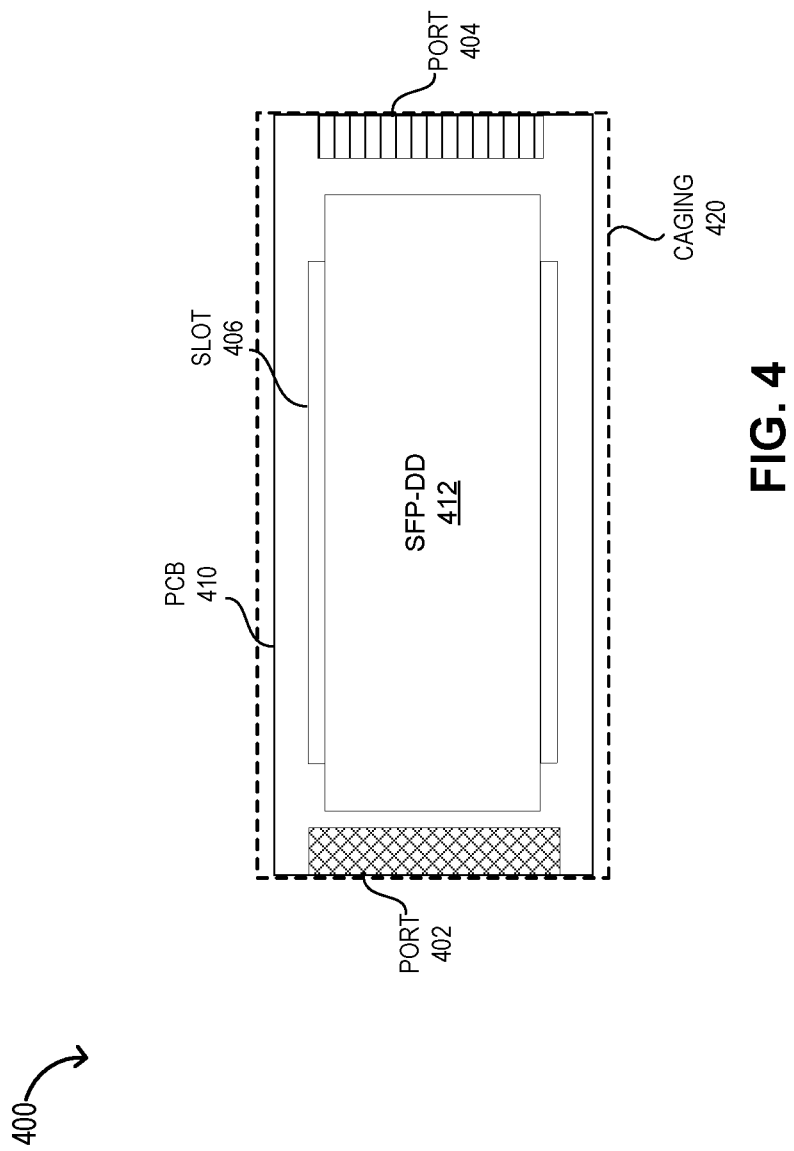
FIG. 4 illustrates an exemplary SFP-DD package, in accordance with an embodiment of the present application.

FIG. 4 illustrates an exemplary SFP-DD package, in accordance with an embodiment of the present application. In this example, an SFP-DD package 400 can include a set of ports 402 and 404, a PCB 410, a card slot 406, and an SFP-DD module 412. It should be noted that SFP-DD package 400 can be implemented using application-specific integrated circuit (ASIC) chips. SFP-DD package 400 can also be part of a system-on-chip (SoC).

PCB 410 can carry card slot 406, and ports 402 and 404. Card slot 406 is used for accommodating (e.g., inserting) SFP-DD module 412. Port 402 (or port 404) can be coupled with card slot 406 and used for transferring a signal to or from SFP-DD module 412. To ensure that SFP-DD module 412 can be properly housed in SFP-DD package 400, card slot 406 can include connector pins that can accommodate an SFP-DD module 412 that supports at least two communication channels, as described in conjunction with FIGS. 2A-2C. In other words, the housing of SFP-DD package 400 is configured according to the dimensions of one of SFP-DD modules 200, 230, and 250.

Since SFP-DD module 412 can include an additional row of connector pins, the connector pins in SFP-DD module 412 are lengthened. As a result, the housing of SFP-DD module 412 is correspondingly extended to protect the connector pins. Therefore, caging 420 of SFP-DD package 400 also needs to be extended. However, other dimensions can remain unchanged to accommodate a single-channel SFP module (e.g., SFP module 100 in FIG. 1A). Hence, SFP-DD package 400 can also accommodate SFP module 100 in FIG. 1A. It should be noted that since the connector pins of SFP module 100 are shorter than SFP-DD module 412, caging 420 of SFP-DD package 400 includes a position restriction to prevent SFP module 100 from being inserted to the bottom.

Deployments

Figure 5A:
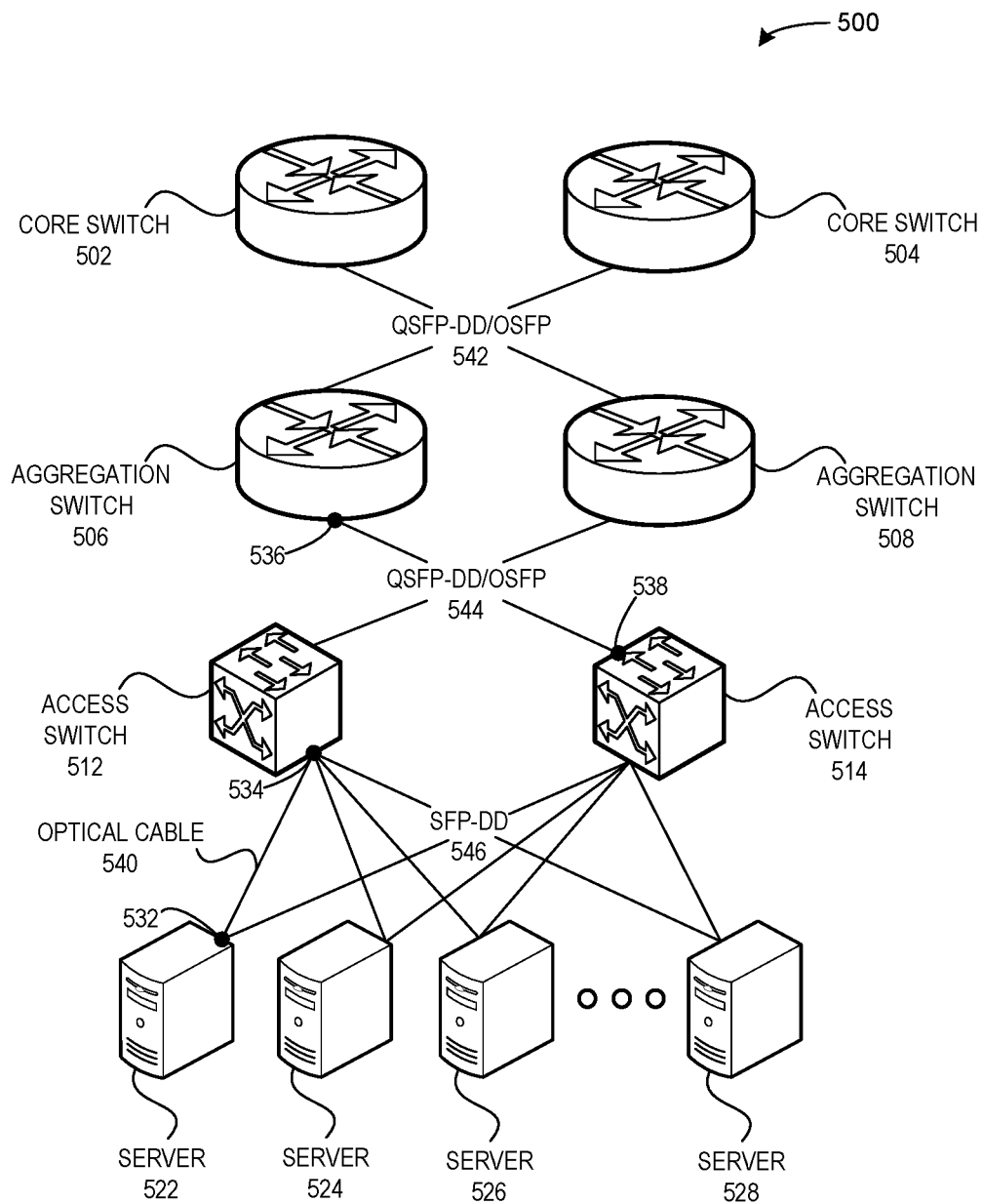
FIG. 5A illustrates an exemplary deployment of SFP-DD modules in a network, in accordance with an embodiment of the present application.

FIG. 5A illustrates an exemplary deployment of SFP-DD modules in a network, in accordance with an embodiment of the present application. A communication system 500 includes core switches 502 and 504, aggregation switches 506 and 508, access switches 512 and 514, and a number of servers 522, 524, 526, and 528. In some embodiments, some of the switches and servers can be in a datacenter. Servers 522, 524, 526, and 528 are coupled to access switches 512 and 514 via corresponding SFP-DD modules 546.

For example, server 522 and switch 512 can be coupled to each other with optical cable 540 via SFP-DD modules 532 and 534, respectively. Therefore, server 522 and access switch 512 can be equipped with optical interfaces that support SFP-DD modules. It should be noted that such optical interfaces may also support single-channel SFP modules. On the other hand, access switches 512 and 514 are coupled to aggregation switches 506 and 508 via QSFP-DD and/or OSFP modules 544. For example, aggregation switch 506 and access switch 514 can be coupled to each other with QSFP-DD (or OSFP) modules 536 and 538, respectively. Hence, aggregation switch 506 and access switch 514 can be equipped with optical interfaces that support QSFP-DD (or OSFP) modules.

Similarly, aggregation switches 506 and 508 are coupled to core switches 502 and 504 via QSFP-DD and/or OSFP modules 542. QSFP-DD and/or OSFP modules 542 can facilitate 400 G connections. On the other hand, SFP-DD modules 546 can facilitate 100 G connections. In this way, SFP-DD modules 546 ensure high-speed connection in system 500 while maintaining high port density on access switches 512 and 514, thereby allowing access switches 512 and 514 to serve a large number of servers.

Figure 5B:
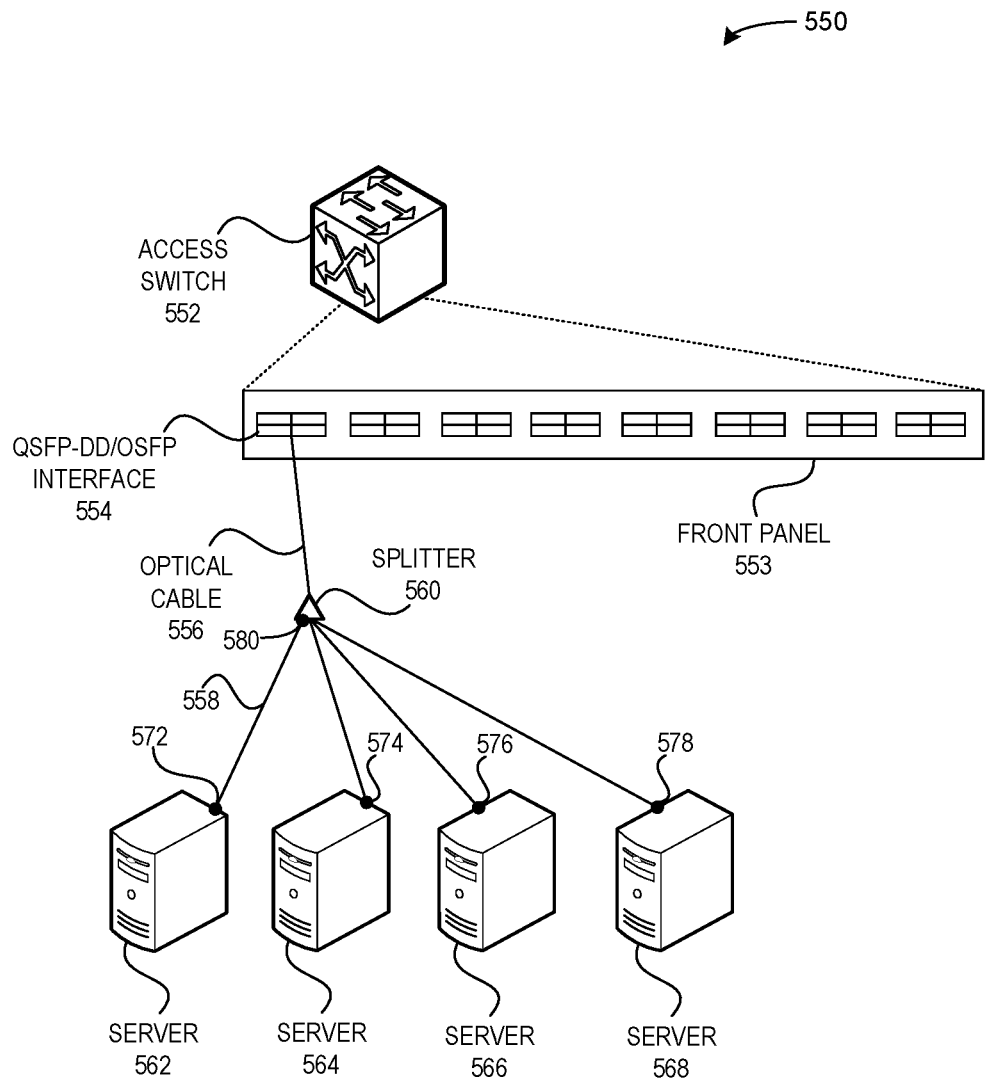
FIG. 5B illustrates an exemplary deployment of SFP-DD modules using an optical splitter, in accordance with an embodiment of the present application.

FIG. 5B illustrates an exemplary deployment of SFP-DD modules using an optical splitter, in accordance with an embodiment of the present application. In this example, a communication system 550 includes an access switch 552 and a number of servers 562, 564, 566, and 568. Access switch 552 can include a front panel 553 comprising a plurality of QSFP-DD or OSFP interfaces (i.e., that can accommodate QSFP-DD or OSFP modules). One such interface can be QSFP-DD or OSFP interface 554. Each of servers 562, 564, 566, and 568 can be equipped with SFP-DD interfaces. Interface 554 can be coupled with a splitter 560 via an optical cable 556.

Since interface 554 can support a 400 Gbps data rate, optical cable 556 can carry a 400 G connection. This connection can be split into four 100 G connections via splitter 560. Each of these 100 G connections can be coupled to a server 562, 564, 566, or 568 via a corresponding SFP-DD module. For example, splitter 560 and server 562 can be coupled to each other with optical cable 558 via SFP-DD modules 580 and 572, respectively. Here, optical cable 558 can be a direct attach cable (DAC) or an active optical cable (AOC). In the same way, splitter 560 can be coupled with servers 564, 566, and 568 via SFP-DD modules 574, 576, and 578, respectively.

In some embodiments, two SFP-DD modules can also be coupled through a cable. This cable can be a copper cable or an optical cable. For example, to use a copper cable, the SFP-DD modules can be copper modules and the cable can be a passive direct attach copper cable. On the other hand, to use an optical cable, the SFP-DD modules can be optical modules and the cable can be an active optical cable.

Figure 6A:
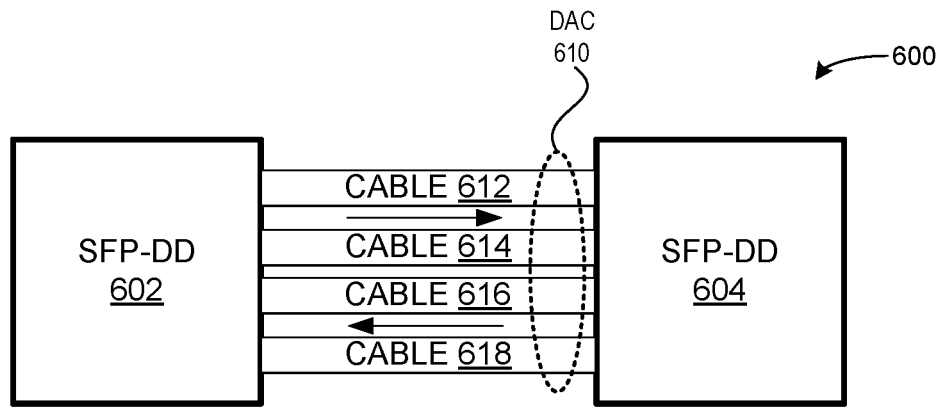
FIG. 6A illustrates an exemplary direct attach cable (DAC) based on SFP-DD modules, in accordance with an embodiment of the present application.

FIG. 6A illustrates an exemplary DAC based on SFP-DD modules, in accordance with an embodiment of the present application. In this example, a communication system 600 includes a 100 G passive DAC 610 coupling SFP-DD modules 602 and 604. Here, SFP-DD modules 602 and 604 can be copper modules. DAC 610 can include a set of signal-transmitting copper cables and a set of signal-receiving copper cables. DAC 610 can carry signals in one direction via the signal-transmitting copper cable group and in the other direction via the signal-receiving copper cable group.

Each of SFP-DD modules 602 and 604 includes two high-speed signal channels for transmission and two high-speed signal channels for reception. Four corresponding high-speed copper cables coupled to SFP-DD modules 602 and 604 can form 100 G DAC 610. For example, cables 612 and 614 can be used for transmission from SFP-DD module 602 to SFP-DD module 604. Similarly, cables 616 and 618 can be used for transmission from SFP-DD module 604 to SFP-DD module 602. From SFP-DD module 602's perspective, cables 612 and 614 form the set of signal-transmitting copper cables, and cables 616 and 618 form the set of signal-receiving copper cables. In this way, DAC 610 facilitates a low-cost 100 G short-distance (e.g., typically 5 meters) network interconnection.

Figure 6B:
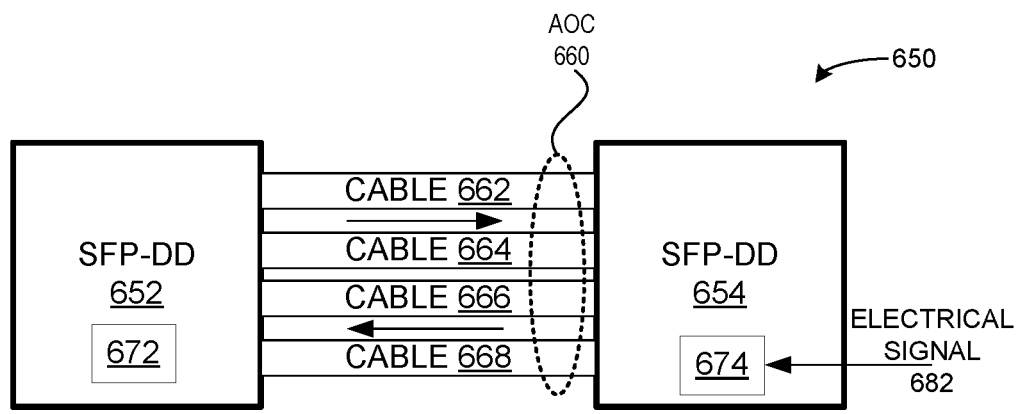
FIG. 6B illustrates an exemplary active optical cable (AOC) based on SFP-DD modules, in accordance with an embodiment of the present application.

FIG. 6B illustrates an exemplary AOC based on SFP-DD modules, in accordance with an embodiment of the present application. In this example, a communication system 650 includes a 100 G AOC 660 coupling SFP-DD modules 652 and 654. Here, SFP-DD modules 652 and 654 can be optical modules. AOC 660 can include a signal-transmitting optical cable group and a signal-receiving optical cable group. AOC 660 can carry signals in one direction via the signal-transmitting optical cable group and, in the other direction via the signal-receiving optical cable group.

Each of SFP-DD modules 652 and 654 includes two high-speed signal channels for transmission and two high-speed signal channels for reception. Four corresponding high-speed optical cables coupled to SFP-DD modules 652 and 654 can form 100 G AOC 660. For example, cables 662 and 664 can be used for transmission from SFP-DD module 652 to SFP-DD module 654. Similarly, cables 666 and 668 can be used for transmission from SFP-DD module 654 to SFP-DD module 652. From SFP-DD module 652's perspective, cables 662 and 664 form the set of signal-transmitting optical cables, and cables 666 and 668 form the set of signal-receiving copper cables. SFP-DD module 652 can convert two 50 G PAM4 electrical signals to two 50 G PAM4 optical signals, as described in conjunction with FIG. 3, and transmit the corresponding optical signals using AOC 660. In this way, AOC 660 facilitates a low-cost 100 G medium-distance (e.g., typically 30 meters) optical network interconnection.

Operations

Figure 7A:
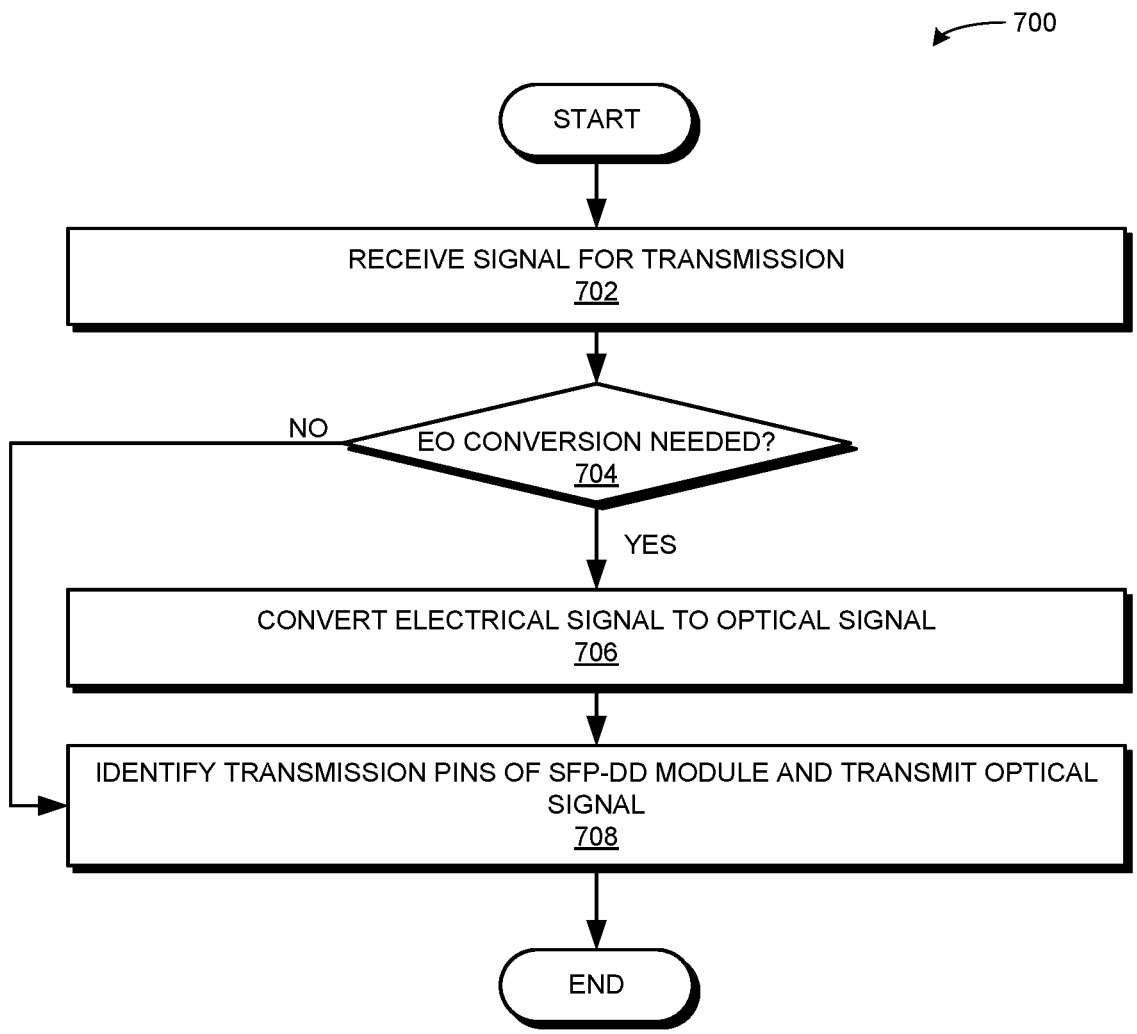
FIG. 7A presents a flowchart illustrating a method of an SFP-DD module transmitting a signal, in accordance with an embodiment of the present application.

FIG. 7A presents a flowchart 700 illustrating a method of an SFP-DD module transmitting a signal, in accordance with an embodiment of the present application. During operation, the module receives a signal for transmission (operation 702) (e.g., from a PAM4 CDR) and determines whether the signal needs an electrical-to-optical (EO) conversion (operation 704). If EO conversion is needed, the module converts the electrical signal to optical signal (operation 706). Upon conversion (operation 706) or if EO conversion is not needed (operation 704), the module identifies the transmission pins of SFP-DD module and transmits the optical signal (operation 708).

Figure 7B:
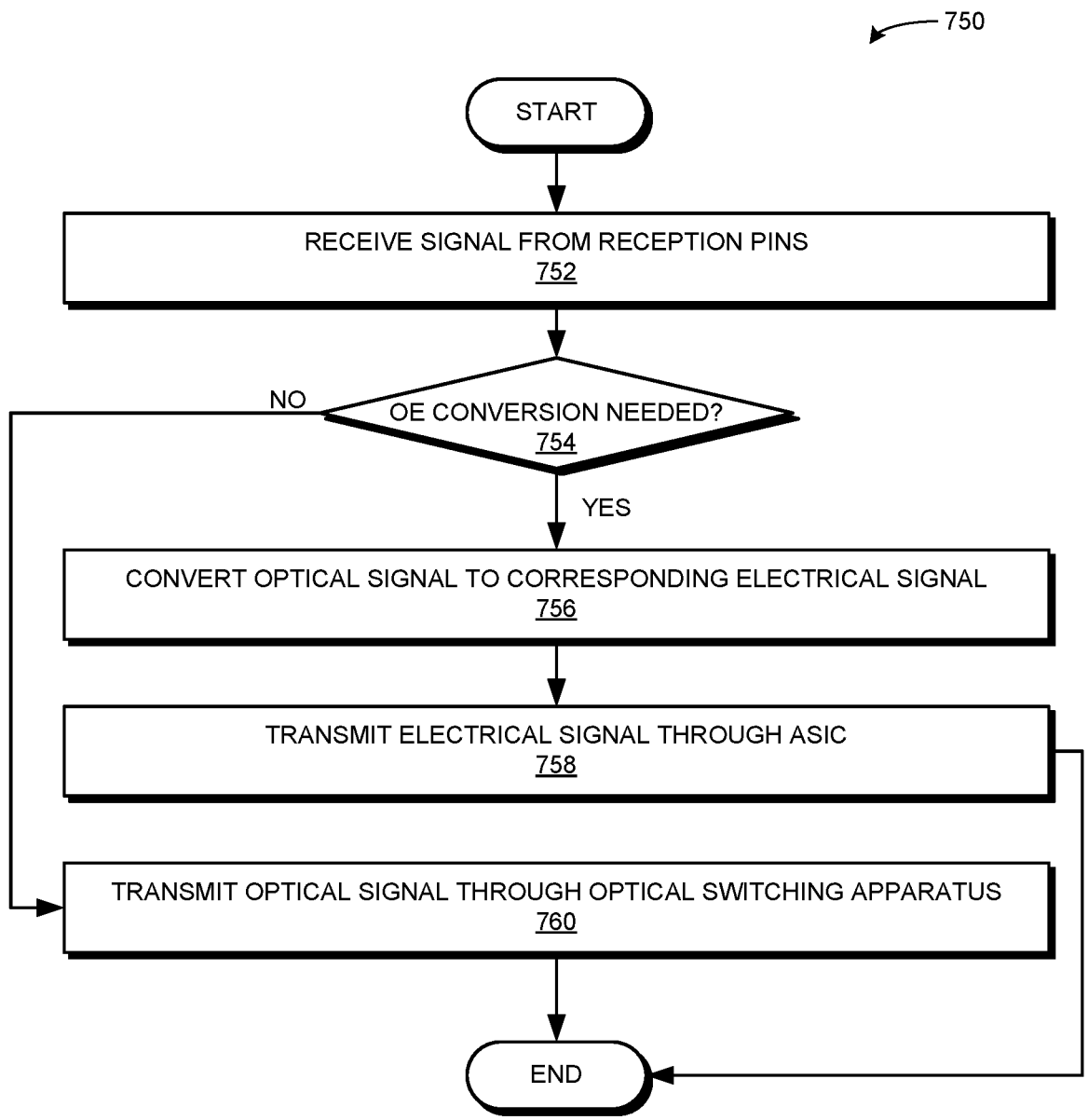
FIG. 7B presents a flowchart illustrating a method of an SFP-DD module processing a received signal, in accordance with an embodiment of the present application.

FIG. 7B presents a flowchart 750 illustrating a method of an SFP-DD module processing a received signal, in accordance with an embodiment of the present application. During operation, the module receives a signal from the reception pins (operation 752) (e.g., from RD pins) and determines whether the signal needs an optical-to-electrical (OE) conversion (operation 754). If OE conversion is needed, the module converts the optical signal to a corresponding electrical signal (operation 756) and transmits the electrical signal through ASIC (operation 758). If OE conversion is not needed, the module transmits the optical signal through the optical switching apparatus (operation 760).

Exemplary System and Apparatus

Figure 8:
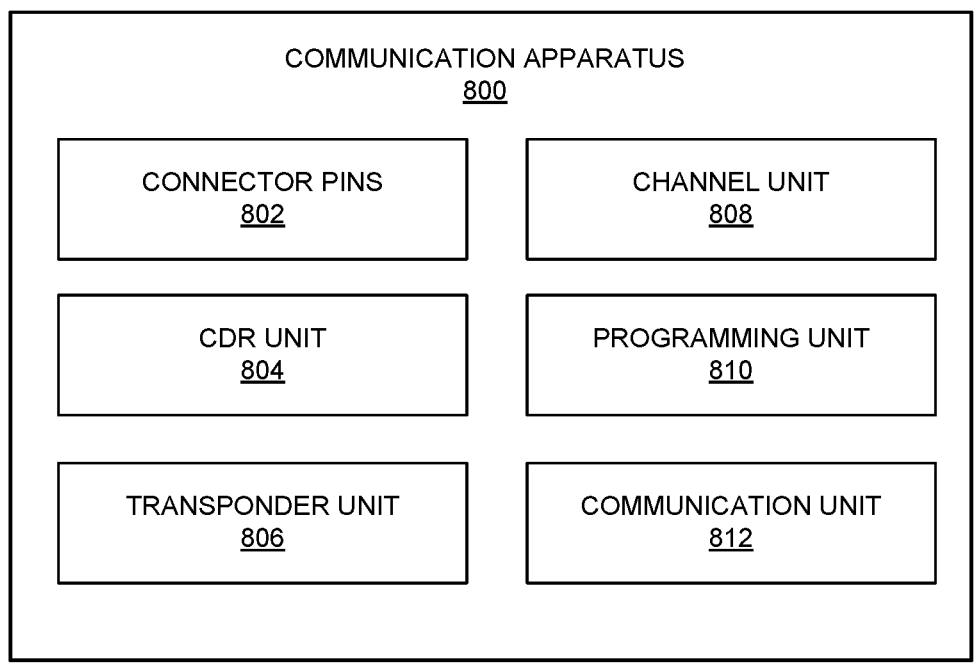
FIG. 8 illustrates an exemplary apparatus that facilitates an SFP-DD module, in accordance with an embodiment of the present application.

FIG. 8 illustrates an exemplary apparatus that facilitates an SFP-DD module, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device which is capable of communicating with other computer systems and/or devices.

Specifically, apparatus 800 can comprise units 802-812, which perform functions or operations described in this disclosure. Connector pins 802 operate as the set of connector pins for one or more SFP-DD modules, as described in conjunction with FIGS. 2A-2C. CDR unit 804 can extract timing information and recover symbols transmitted through connector pins 802. Transponder unit 806 can convert an electrical signal to an optical signal, thereby allowing apparatus 800 to transfer the optical signal via an optical cable. Channel unit 808 can use multiple cable wires to form a link channel, as described in conjunction with FIGS. 6A-6B. Programming unit 810 can program connector pins 802. Communication unit 812 can use connector pins 802 to send and receive data signals.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A pluggable communication module, comprising:
    a set of control connector pins configured to exchange control signals;
    a first set of communication connector pins configured to establish a first communication channel, wherein the first set of communication connector pins are compatible with connector pins of a small form-factor pluggable (SFP) module; and
    a second set of communication connector pins configured to establish a second communication channel, wherein a housing of the pluggable communication module is larger than a housing of the SFP module to accommodate the second set of communication connector pins.

2. The pluggable communication module of claim 1, wherein the pluggable communication module is capable of establishing a communication channel with the SFP module based on the compatibility, and wherein the pluggable communication module includes a position restriction that aligns the SFP module with the first set of communication pins.

3. The pluggable communication module of claim 1, wherein the second set of communication connector pins is on a host side with respect to the first set of communication connector pins.

4. The pluggable communication module of claim 1, wherein each of the first and second sets of communication connector pins includes a set of transmission pins and a set of reception pins.

5. The pluggable communication module of claim 1, wherein, in response to the second set of communication connector pins needing additional power, the second set of communication connector pins includes a set of power and ground pins.

6. The pluggable communication module of claim 1, further comprising a clock and data recovery (CDR) module configured to extract timing information and recover transmitted symbols, wherein the transmitted symbols are one or more of: electrical signal and optical signal.

7. The pluggable communication module of claim 6, further comprising a wavelength-division multiplexing (WDM) transponder configured to convert between the electrical signal and the optical signal.

8. The pluggable communication module of claim 1, wherein the first set of communication connector pins is configured to accommodate a first cable for transmitting a signal associated with the first communication channel and a second cable for receiving a signal associated with the first communication channel, and wherein the second set of communication connector pins is configured to accommodate a third cable for transmitting a signal associated with the second communication channel and a fourth cable for receiving a signal associated with the second communication channel.

9. The pluggable communication module of claim 8, wherein the first, second, third, and fourth cables form one or more of:
    active optical cable (AOC); and
    direct attach cable (DAC).

10. The pluggable communication module of claim 1, wherein the pluggable communication module is configured to plug into a corresponding port of a server for facilitating a communication channel between the server and an access switch.

11. An apparatus facilitating a pluggable double-density small form-factor pluggable (SFP-DD) module, comprising:
    a set of control connector pins in the SFP-DD module and is configured to exchange control signals;
    a first set of communication connector pins in the SFP-DD module configured to establish a first communication channel, wherein the first set of communication connector pins are compatible with connector pins correspond to connector pins of an SFP module; and
    a second set of communication connector pins in the SFP-DD module configured to establish a second communication channel, wherein a housing of the SFP-DD module is larger than a housing of the SFP module to accommodate the second set of communication connector pins.

12. The apparatus of claim 11, wherein the SFP-DD module is capable of establishing a communication channel with the SFP module based on the compatibility, and wherein the apparatus includes a position restriction that aligns the SFP module with the first set of communication pins.

13. The apparatus of claim 11, wherein the second set of communication connector pins is on a host side with respect to the first set of communication connector pins in the SFP-DD module.

14. The apparatus of claim 11, wherein each of the first and second sets of communication connector pins includes a set of transmission pins and a set of reception pins.

15. The apparatus of claim 11, wherein, in response to the second set of communication connector pins needing additional power, the second set of communication connector pins includes a set of power and ground pins.

16. The apparatus of claim 11, further comprising clock and data recovery (CDR) circuitry configured to extract timing information and recover transmitted symbols, wherein the transmitted symbols are one or more of: electrical signal and optical signal.

17. The apparatus of claim 16, further comprising wavelength-division multiplexing (WDM) transponder circuitry configured to convert between the electrical signal and the optical signal.

18. The apparatus of claim 11, wherein the first set of communication connector pins is configured to accommodate a first cable for transmitting a signal associated with the first communication channel and a second cable for receiving a signal associated with the first communication channel, and wherein the second set of communication connector pins is configured to accommodate a third cable for transmitting a signal associated with the second communication channel and a fourth cable for receiving a signal associated with the second communication channel.

19. The apparatus of claim 18, wherein the first, second, third, and fourth cables form one or more of:
   active optical cable (AOC); and
   direct attach cable (DAC).

20. The apparatus of claim 11, wherein the SFP-DD module is configured to plug into in a corresponding SFP-DD port in a server for facilitating a communication channel between the server and an access switch.

* * * * *